Oct. 7, 1924.
F. W. BORKES
1,511,022
ELECTRIC BRAKE
Filed July 1, 1922
3 Sheets-Sheet 1
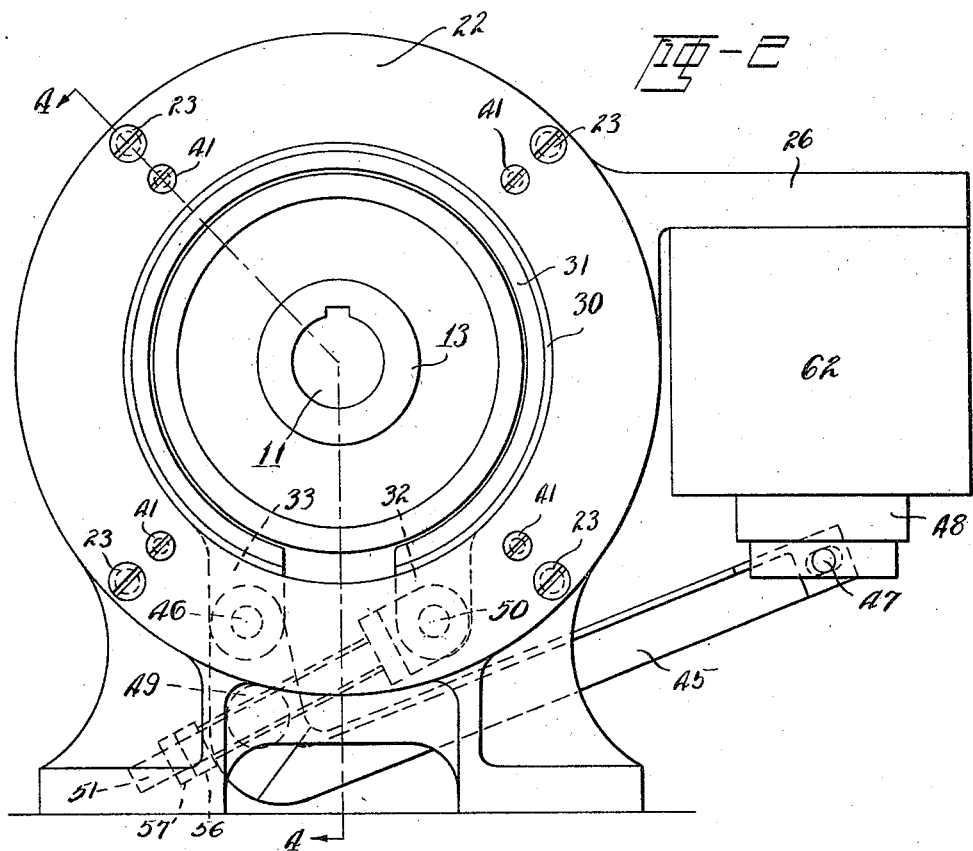
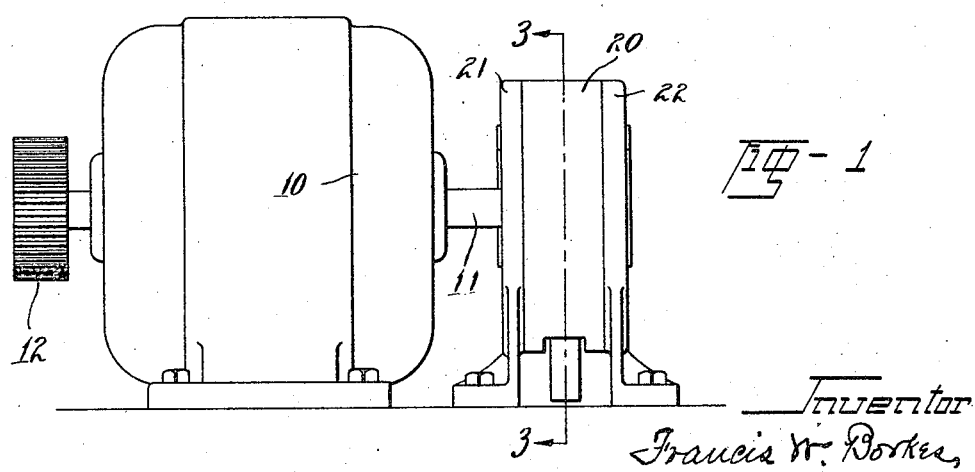
Inventor
Francis W. Borkes,
By Baker Macklin
Attys Oct. 7, 1924.
F. W. BORKES
1,511,022
ELECTRIC BRAKE
Filed July 1, 1922     3 Sheets-Sheet 2
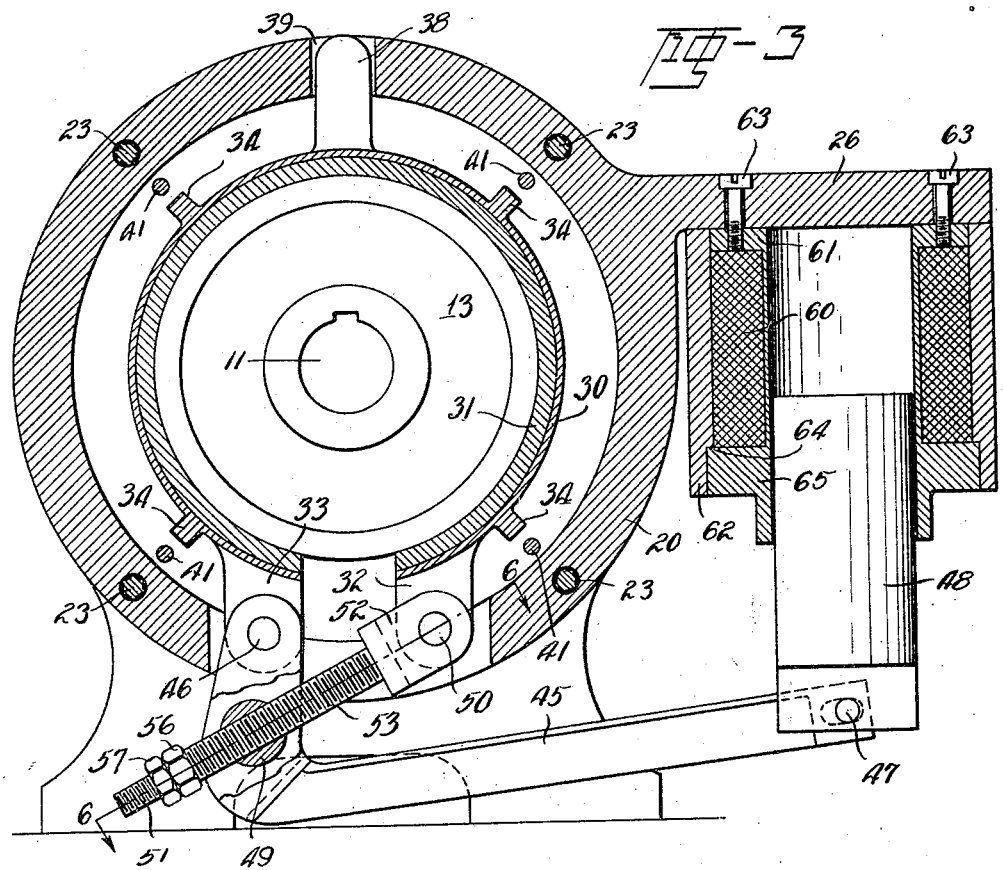
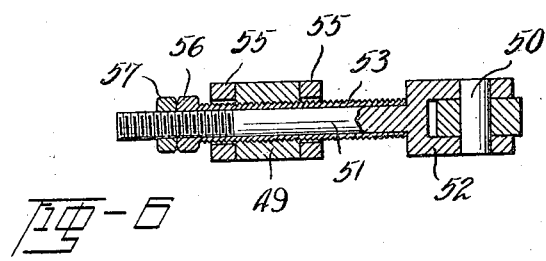
Inventor
Francis W. Borkes,
By Baker & Macklin,
Attys

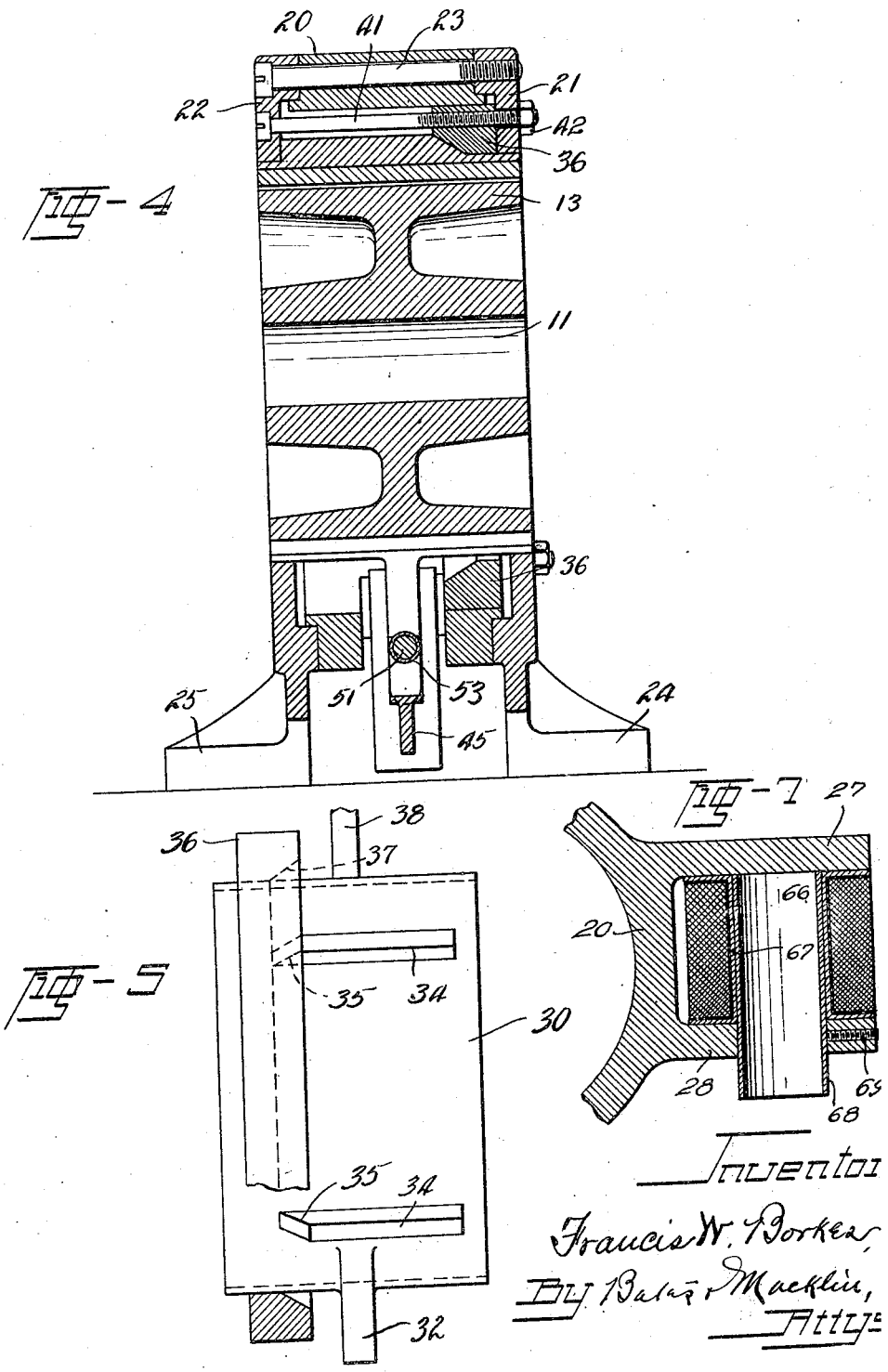

Patented Oct. 7, 1924.

1,511,022

UNITED STATES PATENT OFFICE.

FRANCIS W. BORKES, OF CLEVELAND, OHIO, ASSIGNOR TO THE CHISHOLM-MOORE MANUFACTURING COMPANY, OF CLEVELAND, OHIO, A CORPORATION OF OHIO.

ELECTRIC BRAKE.

Application filed July 1, 1922. Serial No. 572,127.

*To all whom it may concern:*

Be it known that I, FRANCIS W. BORKES, a citizen of the United States, residing at Cleveland, in the county of Cuyahoga and State of Ohio, have invented a certain new and useful Improvement in an Electric Brake, of which the following is a full, clear, and exact description, reference being had to the accompanying drawings.

This invention relates to electric brakes, such as are adapted for use in connection with the operation of motor-driven apparatus, and particularly to a type of brake wherein the clamping element is released when the current to the motor is turned on, but is set or locked when the current is turned off.

One of the objects of my invention, is the provision of means for effecting the operation of a brake in a simple and efficient manner, and at the same time housing the construction in a compact casing which may be readily applied to motors. Another object is to utilize the force of gravity in connection with a solenoid for setting the brake to stop the spinning of the motor when the current in the solenoid is turned off.

Still another object is the provision of means for adjusting the brake radially so that the lining is out of contact with the brake wheel when the motor is in operation, and to provide further adjusting means for regulating the circumferential adjustment of the band, in accordance with the requirements necessitated by wear of the brake lining.

Other objects will become apparent in the following description which pertains to the accompanying drawings, and the essential features will be summarized in the claims.

In the drawings, Fig. 1 is an elevation of a motor having a brake embodying my invention associated therewith; Fig. 2 is an end view showing the brake on an enlarged scale; Figs. 3 and 4 are sections on the lines 3—3 and 4—4 in Figs. 1 and 2 respectively; Fig. 5 is an elevation of a brake band having a locking ring associated therewith and removed from the brake housing; Fig. 6 is a section taken on the line 6—6 in Fig. 3. Fig. 7 is a sectional detail of a modification of the solenoid and its carrying means.

My invention is shown as embodied in a brake such as is adapted for use in stopping the spinning of a motor after the current thereto is turned off, and may be utilized to hold the load on a suitable hoisting mechanism. Accordingly, in the various figures, I have indicated a motor at 10 as having an armature shaft 11, and a pinion 12 by which suitable apparatus may be driven. The armature shaft may be extended and provided with a brake wheel 13 which is adapted to be surrounded by a brake band mounted in a suitable housing therefor. The means for adjusting the brake band and for controlling the operation thereof constitute important characteristics of my invention and will hereinafter be described in detail.

The brake casing is indicated as an annular member 20 which surrounds the brake wheel and is adapted to be positioned between end plates 21 and 22 by suitable fastening means as at 23. These plates may be provided with lugs 24 and 25 respectively for mounting the brake on a suitable support. By turning the end plate 90° or 180° the frame is suitable for wall mounting or ceiling mounting, as desired. The casing is also provided with an extension, Figs. 2 and 3, or a pair of extensions 27 and 28, Fig. 7, adapted to carry a solenoid for controlling the operation of the brake band.

The brake band is shown as a split ring 30 which is adapted to receive a lining 31, and to be positioned over the brake wheel in the usual manner. The ring or band 30 may be provided with a lug 38 which is adapted to project outwardly therefrom and into a suitable complementary shaped recess 39 in the casing 20. This lug positions the band on the wheel and thus prevents it from turning about the wheel beyond a predetermined amount, whereby the actuating links are held out of contact with the casing. The ring or band is shown as having lugs 32 and 33 for receiving operating links as will be hereinafter described.

To support the band within the casing, I have shown a plurality of spaced ribs 34 which as shown in Fig. 5, extend radially from the band, and on the exterior portion thereof. These ribs may be tapered as at 35, preferably adjacent one edge thereof for engagement with an annular member 36 which surrounds the band and is provided with an undercut tapered portion as at 37, which is complementary to the tapered portion on the ribs. The outer surface of the annular member 36 is in close-fitting engagement with the inner surface of the casing 20, whereby the band 30 is supported so as to clear the circumferential face of the brake wheel when the brake is released.

The ring 36 is shown as having threaded openings extending therethrough and parallel to the axis of the wheel and intermediate the exterior of the band and the interior of the casing 20. Suitable adjusting screws 41 extending freely through the face rings 22 and 21 are threaded in the openings of the ring 36 to draw the ring forwardly, thus compressing the band 30 and adjusting the lining so that it is out of contact with the wheel when the brake is released. Jam nuts 42 on the ends of the screws 41 serve to lock them in adjusted position.

To actuate the brake, I have shown a brake arm 45, in the nature of a bell crank lever, one end of which is pivoted as at 46 to the lug 33 and the other end of which, is pivoted as at 47 to the lower end of a solenoid armature 48. The brake arm is intermediately pivoted as at 49 to an adjustable link which in turn may be pivoted as at 50 to the lug 32 on the brake band. The link connecting the lug 32 to the brake arm, as shown in Fig. 6, preferably embodies a threaded shank 51 which is integral with a yoke 52, and a sleeve 53 which has a threaded exterior in engagement with a correspondingly internally threaded pivot pin 49. This pivot pin may be held between arms 55 forming a portion of the brake arm adjacent the brake band. The outer end of the sleeve 53 may be formed for engagement by a wrench, whereby the pivot pin 49 may be adjustable relatively to the pin 50 to control the circumferential movement of the brake band upon the operation of the solenoid armature. A suitable jamb nut 57, threaded on the shank 51 may be used for clamping the sleeve after it is properly adjusted relatively to the associated pin 49.

The adjusting means embodied in the complementary shaped band and ring then, is employed for controlling the radial adjustment between the lining and brake wheel when the brake is released, and also for supporting the band so that the wheel may revolve freely without engaging the lining. The other adjusting mechanism embodied in the afore-mentioned link is concerned with varying the distance between floating pivots, whereby the adjustment necessitated by wear of the brake lining may be effectively controlled in accordance with the throw of the solenoid armature.

Shown in Figs. 2 and 3, the solenoid construction embodies a coil 60 which is wound on a core 61 and is adapted to be encased by a sleeve 62. The coil is suspended by a member 63 from the extension 26 of the brake casing. When the solenoid is suspended the sleeve is prevented from dropping by an annular shoulder 64 which engages a corresponding shoulder on the flange 65 of the solenoid core.

In the construction shown in Fig. 7, the solenoid winding is about a brass spool 67 (intermediately lined with insulation), which is removable as a unit from the space between two frame ears 27 and 28. This spool is normally held in place by a thin brass sleeve 68 clamped in the ear 28 by a set screw 69. This sleeve forms a convenient guide for the movable core 48.

Assuming that a brake band constructed according to my invention and having a suitable lining therefor, is positioned around the wheel 13 within the casing 20, and that the motor is stationary, then, the solenoid is de-energized, whereupon the armature 48 is held by the force of gravity in the position indicated in Fig. 3. In this position, the brake arm and the associated link are so related, that the brake is set, thus preventing rotation of the motor shaft. In this position, then, the link is adjusted to set the brake as tightly as desired. When the current of the motor is turned on, the solenoid is energized, since the windings for the coil are in series with the motor, whereupon the armature 48 is drawn upwardly to the position indicated in Fig. 2, thus releasing the brake. Then, to adjust the brake band so as to take it out of contact with the rotating brake wheel, the screws 41 are turned to move the ring 36 forwardly or rearwardly, whereupon the band 30 is moved inwardly or outwardly as desired.

In view of the foregoing description, it will be seen that a brake constructed according to my invention may be readily adjusted in the operative or inoperative positions, to permit the brake wheel to be rotated freely when the motor is in operation, without placing an additional load upon the motor, and further that the adjustments may be made for controlling the movement of the brake band in accordance with the stroke of the operating arms therefor. In addition, a brake of this character, is readily adapted for electric control by the use of a solenoid, and that when so employed, the device may be compactly housed and be capable of operation with a small number of parts.

I claim:—

1. In a device of the character described, the combination with a brake wheel, of a brake band therefor, a casing for said band, an axially shiftable member associated with the casing for adjusting the band radially, and other means for adjusting the band circumferentially.

2. In a device of the character described, the combination with a brake wheel, of a brake band surrounding the wheel, a casing enclosing the band, an axially shiftable member associated with the casing for adjusting the band radially and relatively to the wheel, and electro-magnetic means associated with the casing for controlling the brake.

3. In a device of the character described, the combination with a brake wheel, of a brake band therefor, a casing surrounding the brake band, a cam member intermediate the band and casing for adjusting the band radially, other means associated with the band for adjusting it circumferentially, and electro-magnetic means associated with the casing for controlling the operation of said brake.

4. In a device of the character described, the combination with a brake wheel, of a brake band therefor, a casing enclosing the band, an endless member associated with the casing for adjusting the brake band radially and relatively to the wheel, means for adjusting the band circumferentially, said means including a pair of links, electro-magnetic means carried by the casing and having an armature disposed vertically, one of said links being connected with the armature whereby movement of the armature controls the operation of said brake.

5. In a device of the character described, the combination with a brake wheel, of a brake band therefor, a casing enclosing the band, and an annular cam member intermediate the band and casing and surrounding the band for adjusting it radially and relatively to the wheel.

6. In a device of the class described, the combination with a brake wheel, of a brake band comprising a split ring therefor, an endless member surrounding the ring, a casing, and means associated with the casing for moving the member relatively thereto whereby the opening and closing of the band may be controlled.

7. In a device of the character described, the combination with a brake wheel, of a brake band therefor, said band comprising a split ring having a plurality of projections spaced thereon, an endless member surrounding the band and engaging said projections, a casing, and means for moving the member relatively to the casing for controlling the opening and closing of said band.

8. In a device of the character described, the combination with a brake wheel, of a brake band therefor comprising a split ring, portions of said band being tapered, an endless member surrounding the band and engaging said tapered portions, and means for moving the member relatively to the band for controlling the opening and closing operations thereof.

9. In a device of the character described, the combination with a brake wheel, of a brake band comprising a split ring, a plurality of spaced ribs having tapered surfaces thereon, an endless member surrounding the band and having a portion thereof complementary to the tapered surfaces on said band, a casing, and means associated with the casing for controlling the movement of the member, whereby the band may be opened and closed upon said wheel.

10. In a device of the class described, the combination with a brake wheel, of a brake band therefor, said band comprising a split ring having spaced ribs thereon, an endless member adapted to engage the ribs and to be shiftable thereon for supporting the band when the brake is released, links connected with the ends of the band for controlling the operation of the brake, and electro-magnetic means for actuating said links.

11. In a device of the character described, the combination with a brake wheel, of a brake band therefor, said band comprising a split ring having spaced projections extending radially therefrom, an endless member engaging the projections, a casing, means associated with the casing for adjusting the band radially, a solenoid carried by the casing and having a vertically disposed armature associated therewith and means connecting the solenoid to the ends of said band, whereby movement of the solenoid vertically, controls the operation of the brake.

12. In a device of the class described, the combination with a brake wheel, of a brake band therefor, said band comprising a split ring having spaced radially extending ribs thereon, an endless member surrounding the ribs, a casing, means associated with the casing for moving said member relatively thereto, whereby the band may be adjusted radially, links connected with the ends of the band, and to each other, and electro-magnetic means carried by the casing and connected to one of said links for controlling the operation of the brake.

13. In a device of the class described, the combination with a brake wheel, of a brake band therefor, said band comprising a split ring, a casing, means associated with the casing for adjusting the band radially to the wheel, a pair of links each having one end thereof pivoted to the ends of the brake band, one of said links being pivoted to the other and adjustable relatively thereto, a solenoid carried by the casing, and having an armature disposed vertically, said armature being connected by a lost motion connection to one of said links, whereby the energization of the solenoid raises the armature to release the brake and the de-energization of the solenoid releases the armature to set the brake.

14. In a device of the class described, the combination with a casing, of a brake wheel therein, a brake band therefor, said band comprising a split ring having lugs adjacent the ends thereof, a link pivoted to each lug, one of said links having a threaded shank, and a sleeve loosely mounted thereon, said sleeve being in threaded engagement with the other of said links, whereby the circumferential relation of the band to the wheel may be adjusted, and electro-magnetic means associated with the casing for controlling the movement of said links.

15. In a device of the class described, the combination with a brake wheel, of a brake band therefor, said band comprising a split ring having lugs adjacent the ends thereof, links pivotally mounted on each lug, one of said links having a member pivotally carried thereby, an externally threaded sleeve slidable on the last mentioned link, and in threaded engagement with said member, means associated with said sleeve for adjustably clamping it against rotation with said member, and means for actuating said links to control the operation of the brake.

16. In a device of the class described, the combination with a brake wheel, of a brake band therefor, said band having radially extending tapered ribs spaced thereon, an endless member embracing the ribs and shaped complementary thereto, a casing surrounding the member, means associated with the casing for moving the member along said ribs for adjusting the band radially, said casing having one or more overhanging extensions, a solenoid carried thereby, an armature movable therein, a link having one end thereof connected to the solenoid and having the other end pivoted to one end of said band, another link having one end pivoted to the other end of said band and having the free end thereof pivoted to the first mentioned link, and means associated with said links for adjusting the band circumferentially on said wheel.

17. In a device of the class described, the combination with a hollow casing having a brake wheel therein, of a brake band comprising a split ring surrounding the wheel, said band having radially extending ribs spaced thereon, said ribs being tapered transversely of the band, an endless member having an annular groove undercut therein complementary to the tapered surfaces on said ribs, means associated with the casing and for moving the member relatively thereto and for adjusting the band radially on said casing, a solenoid carried by a projecting member or members of the casing and having an armature disposed vertically therein, means connecting the lower end of the armature with the ends of said band, whereby the solenoid upon being energized, raises the armature and releases the brake, said armature being operative by gravity upon the de-energization of the solenoid to lock the brake.

In testimony whereof, I hereunto affix my signature.

FRANCIS W. BORKES.